United States Patent [19]

Shah

[11] Patent Number: 4,755,419
[45] Date of Patent: Jul. 5, 1988

[54] OXYGEN BARRIER ORIENTED SHRINK FILM

[75] Inventor: Gautam P. Shah, Simpsonville, S.C.

[73] Assignee: W. R. Grace & Co., Cryovac Div., Duncan, S.C.

[21] Appl. No.: 842,600

[22] Filed: Mar. 21, 1986

[51] Int. Cl.⁴ .......................................... B32B 27/08
[52] U.S. Cl. .................................... 428/220; 428/35; 428/349; 428/476.1; 428/476.9; 428/516; 428/518
[58] Field of Search ................... 428/476.3, 349, 516, 428/520, 35, 518, 525, 476.9, 476.1; 156/244.11; 206/532

[56] References Cited

U.S. PATENT DOCUMENTS

| | | | |
|---|---|---|---|
| 4,182,457 | 1/1980 | Yamada et al. | 428/35 X |
| 4,284,674 | 8/1981 | Sheptak | 428/475.5 |
| 4,355,721 | 10/1982 | Knott et al. | 428/35 X |
| 4,398,635 | 8/1983 | Hirt | 206/532 |
| 4,400,428 | 8/1983 | Rosenthal et al. | 428/349 |
| 4,405,667 | 9/1983 | Christensen et al. | 428/35 |
| 4,407,873 | 10/1983 | Christensen et al. | 428/35 |
| 4,421,823 | 12/1983 | Theisen et al. | 428/349 |
| 4,457,960 | 7/1984 | Newsome | 428/35 |
| 4,464,443 | 8/1984 | Farrell et al. | 428/518 |
| 4,495,249 | 1/1985 | Ohya et al. | 428/516 |
| 4,501,797 | 2/1985 | Super et al. | 428/349 |
| 4,501,798 | 2/1985 | Koschak et al. | 428/349 |
| 4,514,465 | 4/1985 | Schoenberg | 428/516 X |
| 4,532,189 | 7/1985 | Mueller | 428/520 |
| 4,557,780 | 12/1985 | Newsome et al. | 156/244.11 |
| 4,561,920 | 12/1985 | Foster | 156/244.11 |
| 4,588,648 | 5/1986 | Krueger et al. | 428/475.8 |

FOREIGN PATENT DOCUMENTS

| | | | |
|---|---|---|---|
| 0149321 | 7/1985 | European Pat. Off. | 428/518 |
| 2139948 | 11/1984 | United Kingdom | 428/515 |

Primary Examiner—Thomas J. Herbert
Attorney, Agent, or Firm—John J. Toney; William D. Lee, Jr.; Mark B. Quatt

[57] ABSTRACT

A coextruded multiple layer oriented film comprises a core layer of ethylene vinyl alcohol copolymer, and two intermediate layers each comprising a polyamide. Two outer layers comprising polymeric materials or blends of polymeric materials such as (a) linear low and linear medium density polyethylene, and EVA, and (b) blends of polypropylene and ethylene propylene copolymer are adhered to the intermediate polyamide layers by means of modified polymeric adhesive materials. A multilayer film with a combination of oxygen barrier properties, toughness, shrinkability, and good optical properties is obtained.

23 Claims, 1 Drawing Sheet

OXYGEN BARRIER ORIENTED SHRINK FILM

BACKGROUND OF THE INVENTION

This invention relates to oriented thermoplastic films for packaging applications, and more particularly relates to coextruded multilayer, oriented film having good strength and oxygen barrier characteristics.

Thermoplastic film, and especially polyolefin materials, have been used in the past to package various articles including perishable food products which require protection from the environment, resistance to physical and environmental abuse during storage and distribution, and an aesthetic and attractive appearance. Optical properties such as high gloss, high clarity, and low haze contribute to the aesthetic consumer appeal of products wrapped in such packaging materials. Good optical properties also permit adequate inspection of the packaged product during the distribution cycle and by the end-user at point of purchase.

Oxygen barrier characteristics are required to provide extended shelf life for the packaged product in the case of food items, and various materials has been used to provide lower gas permeability and thereby reduce the oxygen transmission of the film. For example, ethylene vinyl alcohol copolymer (EVOH) has been known for some time as a good oxygen barrier material, and has been used in the past in conjunction with multilayer packaging films, as described below in several patent publications. EVOH has also proved to be a good barrier to odors or fragrances.

A shrink feature may be imparted to a thermoplastic film by orientation of the film during its manufacture. This shrink feature allows the film to shrink or, if restrained, create shrink tension within the packaging film upon exposure to heat, for example, in a hot water bath or by exposure to hot air. In a typical process, manufactured film is stretched in either the machine direction or perpendicular to the machine direction, or both, i.e., in the longitudinal and transverse directions respectively, in varying degrees to impart a desired degree of shrinkability to the film upon subsequent heating. After this stretching operation, the film is rapidly cooled to impart this latent shrinkability to the resulting film. Shrinkable film provides a tight, smooth appearance to a product wrapped in such film, as well as some added toughness in order to protect the packaged product from abuse.

Of interest is U.S. Pat. No. 4,421,823 issued to Theisen et al directed to a flexible wrapping material of limited construction having a biaxially oriented polypropylene/oxygen barrier substrate, in which the oxygen barrier material may be EVOH; an extrusion laminate of a biaxially oriented polymer such as polypropylene or nylon, bonded to polyethylene; and a layer of heat sealable polymeric material such as ethylene vinyl acetate copolymer laminated to the substrate. A special polymer which may be, for example, polyethylene or ethylene vinyl acetate copolymer is bonded to one surface of the biaxially oriented polypropylene.

Of interest is U.S. Pat. No. 4,457,960 issued to Newsome, disclosing a multilayer film having a core layer of a barrier material such as EVOH and EVOH blends. This film may be shrinkable and may be melt extruded, and may contain outside layers having a blend of linear low density polyethylene and ethylene vinyl acetate copolymer.

Of interest is U.S. Pat. No. 4,464,443 issued to Farrell et al, disclosing the use of EVOH in a five layer structure having outside layers of high density polyethylene and intermediate layers of Plexar adhesive.

Of interest is U.S. Pat. No. 4,495,249 issued to Ohya et al, disclosing a five-layer film having a core layer of saponified copolymer of ethylene and vinyl acetate, two outer layers of a mixture of linear low density polyethylene and ethylene vinyl acetate copolymer, and two adhesive layers disposed between the core layer and outer layers.

Of interest is U.S. Pat. No. 4,514,465 issued to Schoenberg, disclosing a five-layer thermoplastic film having surface layers comprising a four-component blend of linear low density polyethylene, linear medium density polyethylene, ethylene vinyl acetate copolymer and at least one ultra-violet light stabilizer.

Of interest is U.S. Pat. No. 4,398,635 issued to Hirt and disclosing a medication package in which a coextruded multiple layer sheet may have a structure including a layer of ethylene vinyl alcohol copolymer sandwiched between adjacent layers of nylon, and in which one of the nylon layers may be further adhered to a tie resin. The nylon layers may form either an outside surface or, in one example, internal layers with additional layers of polymeric materials added to each side of the sandwich structure.

Of interest is U.S. Pat. No. 4,355,721 issued to Knott et al and disclosing a coextruded multilayer sheet having a first layer of nylon, an EVOH barrier layer, another layer of nylon, an adhesive layer, and another outside layer of, for example, high density polyethylene.

Of interest is U.S. Pat. No. 4,284,674 issued to Sheptak and disclosing a multilayer film having a core layer of ethylene vinyl alcohol copolymer adhered on each side to nylon, each nylon layer in turn being adhered to a chemically modified polyolefin, and a further layer of primer material suitable to adher the modified polyolefin to an outer layer of polypropylene or other materials suitable for conveying toughness, flexcrack resistance and moisture barrier properties to the multi-ply film.

U.S. Pat. No. 4,407,873 issued to Christensen et al, discloses a packaging material for retort applications including a heat seal layer of linear low density polyethylene, a second layer of linear low density polyethylene with optionally 0% to 80% medium density polyethylene blended into the second layer, a third layer of anydride modified medium density polyethylene, a fourth layer of nylon, a fifth layer of ethylene vinyl alcohol copolymer, and a sixth layer of nylon.

Of interest is U.S. Pat. No. 4,400,428 issued to Rosenthal et al, which discloses a composite film having a biaxially oriented polypropylene base film (BOPP) laminated on at least one surface with a multlayer structure including a gas barrier layer of a hydrolyzed ethylene vinyl acetate copolymer and a layer adjacent to the base film, and a heat sealable outer layer which may be, for example, modified propylene/ethylene copolymer. Adhesion-promoting layers of modified polyolefin may include polypropylene containing grafted units of alpha, betamonounsaturated dicarboxylic acids.

U.S. Pat. No. 4,501,797 issued to Super et al, discloses an unbalanced oriented multiple layer film including a first layer of polypropylene, a second layer of an anhydride modified polypropylene, and a third layer of ethylene vinyl alcohol copolymer.

Of interest is U.S. Pat. No. 4,501,798 issued to Koschak et al, disclosing the use of a blend of EVOH and nylon in an unbalanced multiple layer polymer film, also including either linear low density polyethylene or ethylene vinyl acetate copolymer in a sealant layer. Adhesive layers of preferably anhydride derivatives are also present.

It is, therefore, an object of the present invention to provide a coextruded thermoplastic multilayer film characterized by good oxygen barrier properties.

It is a further object of the present invention to provide a thermoplastic multilayer film having an aesthetically pleasing appearance with good optical properties.

It is another object of the present invention to provide a relatively thin thermoplastic multilayer film having superior toughness and abrasion resistance.

It is still another object of the present invention to provide a coextruded thermoplastic multilayer film which may be totally coextruded and then oriented to provide a shrinkable film with good oxygen barrier properties.

SUMMARY OF THE INVENTION

The present invention relates to an oriented multilayer film comprising a core layer comprising an ethylene vinyl alcohol copolymer; two intermediate layers each comprising a polyamide; two outer layers each comprising a polymeric material or blend of polymeric materials; and each of said intermediate layers adhered to a respective outer layer by a layer of adhesive polymeric material.

In another aspect of the invention, a method of making a oriented multilayer film comprises the steps of coextruding a core layer of an ethylene vinyl alcohol copolymer, two intermediate layers of a polyamide, two layers of an adhesive polymeric material, and two outer layers of a polymeric material or blend of polymeric materials; rapidly cooling the coextruded film; collapsing the cooled film; heating the collapsed film to its orientation temperature range; and stretching and orienting the heated film.

DEFINITIONS

"Intermediate layer", "interior layer", and the like are used herein to define a layer in a multilayer film adhered on both sides to other layers.

The term "oriented" and the like is used herein to define a polymeric material which has been heated and stretched to realign the molecular configuration, this stretching accomplished by a racking or blown bubble process. A thermoplastic material stretched in one direction only is uniaxially oriented, and a material stretched in a longitudinal as well as transverse direction is considered biaxially oriented.

The term "ethylene vinyl alcohol copolymer", "EVOH" and the like is used herein to include saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%. The ethylene comonomer is generally present in the range of about 15 to about 65 mole percent.

The term "racking" is used herein to define a well-known process for stretching coextruded and reheated multilayer film by means of tenterframing or blown bubble processes.

The terms "ethylene propylene copolymer", "EPC", and the like, are used herein to denote polypropylene copolymerized with small amounts of ethylene comonomer.

The term "linear low density polyethylene", "LLDPE", and the like are used herein to describe copolymers of ethylene with one or more comonomers selected from preferably $C_4$ to $C_{10}$ alpha olefins such as butene-1, octene, etc. in which the molecules of the copolymers comprise long chains with few side chain branches or cross linked structures. This molecular structure is to be contrasted with conventional low or medium density polyethylenes which are more highly branched than their respective counterparts. LLDPE may also be characterized by the low pressure, low temperature processes used to produce these materials. LLDPE as defined herein has a density usually in the range of from about 0.916 grams/cubic centimeter to about 0.925 grams/cubic centimeter.

The terms "linear medium density polyethylene", "LMDPE", and the like are used herein to refer to copolymers as described above and having a density usually in the range of about 0.926 grams/cubic centimeter to about 0.941 grams/cubic centimeter.

The terms "ethylene vinyl acetate copolymer", "EVA", and the like are used herein to refer to a copolymer formed from ethylene and vinyl acetate monomers wherein the ethylene derived units in the copolymer are present in major amounts, preferably between about 60% and 98% by weight and the vinyl acetate derived units in the copolymer are present in minor amounts, preferably between about 2% and 40% by weight.

The term "polyamide" refers to high molecular weight polymers having amide linkages along the molecular chain, and refers more specifically to synthetic polyamide such as various nylons. This term also refers to copolymers of polyamides such as nylon 6 and nylon 12.

All compositional percentages used herein are calculated on a "by weight" basis, unless otherwise indicated.

BRIEF DESCRIPTION OF THE DRAWINGS

Further details are given below with reference to the sole drawing FIGURE wherein.

DESCRIPTION OF THE PREFERRED EMBODIMENTS

Figure 1:
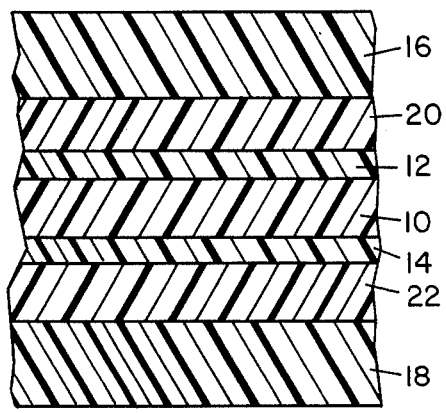
FIG. 1 is a schematic cross section of a preferred embodiment of a multilayer film of the invention.

The sole FIGURE drawing shows a schematic cross section of a preferred coextruded oriented multilayer film of the invention.

The film is preferably a palindromic or symmetrical seven layer structure produced by, for example, cast coextrusion methods, and subsequently oriented, preferably biaxially oriented, typically by means of a blown bubble process.

This seven layer structure is characterized by excellent oxygen barrier properties, as well as improved moisture absorption and strength.

Core layer 10 comprises a barrier material, preferably ethylene vinyl alcohol copolymer, and is preferably between about 0.05 and 1 mil thick. More preferably, core layer 10 is about 0.1 mil thick. Thicknesses less than about 0.05 mil result in a very thin layer which may exhibit voids in the core layer 10 due to incidental variations in the layer thickness. Thicknesses greater than about 1 mil are increasingly difficult to orient during the stretching process, and also add some cost to the film because of the high cost of ethylene vinyl alcohol copolymer resin.

Ethylene vinyl alcohol copolymer resins having an ethylene content of between about 28% and 49% are preferred for the barrier layer.

Core layer 10 is adhered on both surfaces to an intermediate layer 12 and 14 respectively, which comprise polyamide, and more preferably, a copolymer of nylon 6 and nylon 12. A suitable commercially available nylon copolymer is Grillon CA-6, having a composition of about 60% nylon 6 and about 40% nylon 12 by weight. This resin is available from Emser Industries. Another suitable nylon copolymer is CR-9, having 20–30% nylon 6 and 70–80% nylon 12 by weight. Nylon 12 alone as a polymer material could be used in intermediate layers 12 and 14; nylon 6 could also be used alone, but is less preferred because of incompatibility with the ethylene vinyl alcohol copolymer of core layer 10 in terms of melt temperature. The total thickness of the polyamide layers may vary widely. For example, each layer can form between 5% and 25% of the total thickness of the multilayer film.

In one embodiment, outer layers 16 and 18 may comprise a blend of linear low density polyethylene (LLDPE), linear medium density polyethylene (LMDPE), and ethylene vinyl acetate copolymer (EVA).

This blend will typically contain small amounts of slip and antiblock additives. Preferably from about 40% to about 60% by weight of the blend comprises LLDPE, from about 20% to about 30% by weight comprises LMDPE, and about 20% to about 30% by weight comprises EVA. More preferably, the blend comprises about 50% LLDPE, 25% LMDPE, and about 25% EVA. A small percentage of the EVA portion actually comprises the small amounts of slip and antiblock additives typically added at some time during the blending process and prior to extrusion of the blended material.

In the case of the blend described above, i.e., LLDPE/LMDPE/EVA, outer layers 16 and 18 preferably each comprise from about 20% to 40% and more preferably from about 25% to about 35% of the total thickness of the multilayer film. Even more preferably, each of outer layers 16 and 18 comprise about 30% of the total thickness of the multilayer film of the invention. A suitable LLDPE resin is Dowlex 2045 available from Dow Chemical Company, having a melt flow index of from about 0.7 to about 1.2 grams/10 minutes (ASTM-D1238,E-28). This LLDPE is a copolymer of ethylene and octene with a density at 23° C. of about 0.920 grams/cubic centimeter. Another suitable resin is Exxon 3001.

Dowlex 2037 is a suitable LMDPE also obtainable from Dow Chemical Company, and comprising a copolymer of ethylene and octene with a density at 23° C. of about 0.935 grams/cubic centimeter and a melt flow index of about 2.55 grams/10 minutes (ASTM-D-1238,E-28). The EVA of the outer layers 18 and 20 preferably has a vinyl acetate content of between about 3.5 and 9%, and more preferably between about 3.5 and 5% by weight. A suitable EVA resin for use in the present invention is El Paso PE204-CS95 available from El Paso Polyoleofins Company. This material has a density at 23° C. of from about 0.9232 to about 0.9250 grams/cubic centimeter and a melt flow (ASTM-D1238,E-28) of about 2.0±0.5 grams/10 minutes. The vinyl acetate content of this particular EVA is about 3.6% by weight.

In an alternate embodiment, outer layers 16 and 18 may comprise a ethylene propylene copolymer, polypropylene, or blends thereof. The polypropylene may be preblended with about 4% by weight of a silica-containing antiblock agent, about 5% by weight of amide waxes, and about 1% of a lubricating agent. The amide waxes and lubricating agent are well-known in the art as slip agents. In a blend, the polypropylene component of each of outer layers 16 and 18 preferably comprises from about 4% to about 15% by weight of outer layers 16 and 18, and more preferably about 10% by weight of the outer layers of the film. A suitable EPC is Norchem PP3303GK. A commercially available polypropylene to be blended with the EPC is Himont PD064. The EPC/PP blend of outer layer 16 and 18 preferably comprises between about 25 and 35% of the total thickness of the multilayer film, and more preferably about 30% of the total thickness of the film.

Ethylene propylene copolymer and polypropylene may be individually used in the surface layer without blending thereof, but the use of polypropylene alone is less desirable in applications requiring shrinkability. The blend ratios of the EPC and polypropylene may be varied according to desired properties or the end use of the multilayer film. For example, increasing the polypropylene in the blend will add stiffness to the film, but also increase the sealing temperature of the film. Conversely, increasing the EPC in the blend tends to lower the shrink temperature of the oriented film, or to increase the shrink at the same temperature, and also lower the sealing temperature of the film.

To ensure adequate adhesion of the outer layer 16 and 18 to the intermediate polyamide layers 12 and 14 respectively, adhesive layers 20 and 22 are provided as shown in FIG. 1.

The particular adhesive polymeric material selected for layers 20 and 22 is dependent on the blend selected for outer layers 16 and 18. For example, in a case of the first embodiment described above, having a blend of LLDPE/LMDPE/EVA in outer layers 16 and 18, a very suitable adhesive material is Plexar 2581 (Norchem), a linear low density polyethylene-based adhesive. Generally, preferred adhesives are those having blends of a graft copolymer of a linear low density polyethylene and at least one unsaturated, fused ring carboxylic acid anhydride blended with one or more resins such as linear low density polyethylene, although other adhesives such as low density polyethylene-based adhesives, can also be used.

In the case of the alternate embodiment described above, i.e., the ethylene polypropylene copolymer, polypropylene, or blends thereof, a suitable polymeric adhesive material is Modic P310H, a polypropylene based modified adhesive. Other adhesives such as Admer QF 500 available from Mitsui are also suitable for use in connection with this particular blend material.

Other adhesive materials such as CXA E-162, an EVA based polymeric adhesive available from du Pont, may be suitable to some extent in adhering the outer layers 16 and 18 to the intermediate polyamide layers 12 and 14 respectively.

Adhesive layers 20 and 22 will each comprise from about 5% to about 15% of the total thickness of the multilayer film, and more preferably about 10% of the total thickness of the film.

EXAMPLE 1

An oriented film was prepared by blending 50% of LLDPE (Dowlex 2045), 25% LMDPE (Dowlex 2037) and 17% EVA (El Paso PE204-CS95) having a vinyl acetate content of about 3.6%, blended with about 8% of a master batch concentrate containing slip and antiblock additives compounded with EVA of about 3.5% vinyl acetate content by weight.

This outer blend layer was coextruded with a core layer containing EVOH (EVAL-F); intermediate layers of a nylon 6-nylon 12 copolymer (Grillon CA-6); and two adhesive layers (Plexar 2581).

The polymer melts were coextruded through a multilayer coextrusion die and then cooled and cast into a solid tube which was irradiated with about 8 megarads of irradiation. The tube was then heated to about 110° C. in an oven and then blown into a bubble. The bubble was expanded to about 3.3 times its original dimension in the machine (longitudinal) direction, and about 3.5 times its original dimension in the transverse direction and then deflated and ply separated into single wound film rolls. The final film had a thickness of about 1.3 mils, and exhibited good shrink properties, toughness, and optical properties as well as high oxygen barrier characteristics.

Before orientation, the total wall thickness of the tube was about 14 mils, with about 55% of the structure comprising the outer blend layers, 20% of the structure comprising the intermediate polyamide layers, 15% comprising the adhesive layers, and 10% comprising the EVOH core layer.

After stretching and orientation, the film had a total thickness of about 1.3 mils.

The sample film produced in the process described above had tensile strengths at break of 10,630 psi and 11,550 psi, and a modulus of 100,700 psi and 107,100 psi, in the longitudinal and transverse directions respectively (ASTM D882-81 at 73° F.).

The film had a free shrink ranging from 20% and 25% at 200° F. to 67% and 60% at 240° F. (longitudinal and transverse directions respectively) (ASTM D2732-70).

Shrink tension values varied from 338 psi and 446 psi at 200° F. up to 425 psi and 453 psi at 240° F. (longitudinal and transverse directions respectively) (ASTM D2838-81).

The sample film exhibited a haze of 2.6% at 73° F. (ASTM D1003-61), a clarity of 66.7% at 73° F. (ASTM D1746-70) and a gloss of 91 at a 45° angle, 73° F. (ASTM D2457-70).

The film also exhibited an oxygen transmission at 73° F., 0% relative humidity of 1.9cc STP/(24 hours, square meter, atmosphere) (ASTM D3985-81), and an oxygen transmission at 73° F., 100% relative humidity of 369.3cc STP/(24 hours, square meter, atmosphere) (ASTM *Journal of Testing and Evaluation*, Volume 12, No. 3, May 1984, Pages 149–151).

This film is particularly useful in applications requiring good impact resistance and resistance to tear propagation. Interply bond strengths were actually greater than the strengths of the plys themselves. It is believed that useful odor barrier properties are obtained by the use of EVOH and intermediate layers of polyamide.

EXAMPLE 2

A second sample film was made by the same method described above with respect to example 1 except that a blend of ethylene propylene copolymer and polypropylene was used for the outer layers 16 and 18 of the film. Also, the adhesive material comprising layers 20 and 22 was Modic P310H, a polypropylene based polymeric adhesive. The ethylene vinyl alcohol of core layer 10 was EVAL-K having an ethylene content of about 38% by weight, and a relatively high melt index.

This sample film was not irradiated as in the case of example 1.

The sample film had a total thickness after stretching and orientation of about 1.06 mils, and the relative thickness of the various layers was substantially the same as in the sample film of example 1.

Physical properties for the second sample were substantially similar to those described in example 1, but with certain exceptions.

The modulus at 73° F. was 146,100 PSI and 140,200 PSI at 73° F., in the longitudinal and transverse directions respectively. This sample film, therefore, exhibited much less flexibility and stiffer properties than the sample of example 1. Also, the clarity of this sample film was considerably less than that of example 1. Oxygen transmission at 73° F., 100% relative humidity averaged about 180 cc STP/(24 hours, square meter, atmosphere) as an average of three samples, which is a considerable improvement over the film of example 1.

The film had a free shrink ranging from 20% and 25% at 200° F. to 46% at 240° F. (longitudinal and transverse directions respectively). Thus, free shrink is considerably less for this film than the film of example 1.

The test methodology for example 2 in determining physical properties was the same as that for example 1 and listed above.

Utilizing the materials and blends thereof described in connection with outer layers 16 and 18, the multilayer film provides good heat seal properties as well as abuse resistance, making these films useful for packaging food and nonfood articles. The orientation of the multilayer films of the present invention provides toughness and improved resistance to oxygen permeability, in addition to the advantages of a shrinkable film which may be heat shrunk about a product to be packaged. The films of the present invention are preferably from about 0.5 to about 4 mils thick, and more preferably from about 0.5 to about 2 mils thick. Most preferably, these films are about 1 mil thick where 1 mil equals one thousandth of an inch. Orienting the multilayer films of the present invention becomes increasingly difficult for thicknesses greater than 2 mils, and very difficult or impractical for thicknesses greater than about 4 mils.

Irradiation of the preferred embodiment having the LLDPE/LMDPE/EVA blend may be accomplished by means well known in the art, and may be varied to correspond with the desired degree of orientation or the final application of the multilayer film. The alternate embodiment of the multilayer film, including the use of EPC, polypropylene, or blends thereof in the outer layers 16 and 18, is not irradiated.

Generally, the coextruded and cooled tube is heated to its orientation temperature range to orient the film in e.g. a blown bubble process. Orientation temperature ranges are well known for most polymeric materials, and are generally below the melting point of the film.

Preferably, films made in accordance with the present invention are heated to between about 90° C. and 140° C., and more preferably between 105° C. and 115° C.

Obvious modifications to the invention as described may be made by one skilled in the art without departing from the spirit and scope of the claims as presented below.

What is claimed is:

1. A biaxially oriented coextruded film having at least seven layers arranged symmetrically comprising:
   (a) a core layer comprising an ethylene vinyl alcohol copolymer;
   (b) two intermediate layers each comprising a polyamide;
   (c) two outer layers each comprising a blend of polymeric material taken from the group consisting of (i) a blend of a linear low density polyethylene, a linear medium density polyethylene, and an ethylene vinyl acetate copolymer, and (ii) a blend of an ethylene propylene copolymer and a polypropylene;
   (d) two layers, each comprising an adhesive polymeric material, which adhere each of said intermediate layers to a respective outer layer; and
   (e) said film having a total thickness of from about 0.5 mils to about 2 mils.

2. A biaxially oriented multilayer film according to claim 1 wherein said core layer comprises an ethylene vinyl alcohol copolymer with an ethylene content of from about 28% to about 49% by weight.

3. A biaxially oriented multilayer film according to claim 1 wherein said polyamide comprises a nylon 6/nylon 12 copolymer.

4. A biaxially oriented multilayer film according to claim 1 wherein the adhesive polymeric material comprises a linear low density polyethylene-based, acid or acid anhydride-modified polymeric material when the outer layer is blend (i), and a polypropylene-based, acid or acid anhydride - modified polymeric material when the outer layer is blend (ii).

5. A biaxially oriented multilayer film according to claim 1 wherein each of said outer layers comprises a blend of (1) from about 40%, by weight, to about 60%, by weight, of a linear low density polyethylene, (2) from about 20%, by weight, to about 30%, by weight, of a linear medium density polyethylene, and (3) from about 20%, by weight, to about 30%, by weight, of an ethylene vinyl acetate copolymer.

6. A biaxially oriented film according to claim 5 wherein said blend comprises (1) about 50%, by weight, of a linear low density polyethylene, (2) about 25%, by weight, of a linear medium density polyethylene, and (3) about 25%, by weight, of an ethylene vinyl acetate copolymer.

7. A biaxially oriented film according to claim 1 wherein each of said outer layers comprises a blend of (1) from about 85% to about 96%, by weight, of an ethylene propylene copolymer, and (2) from about 4% to about 15%, by weight, of a polypropylene.

8. A biaxially oriented multilayer film accoriding to claim 7 wherein said blend comprises (1) about 90%, by weight, of an ethylene propylene copolymer, and (2) about 10%, by weight, of a polypropylene.

9. A biaxially oriented multilayer film according to claim 1 wherein said film has a total thickness of from about 0.5 mils to about 1.5 mils.

10. A biaxially oriented multilayer film according to claim 9 wherein said film has a total thickness of about one mil.

11. An oriented coextruded film having at least seven layers arranged symmetrically comprising:
   (a) a core layer comprising an ethylene vinyl alcohol copolymer;
   (b) two intermediate layers each comprising a polyamide;
   (c) two outer layers each comprising a polymeric material or blend of polymeric materials; and
   (d) two layers, each comprising an adhesive polymeric material, which adhere each of said intermediate layers to a respective outer layer.

12. An oriented film according to claim 11 wherein said core layer comprises an ethylene vinyl alcohol copolymer with an ethylene content of from about 28% to about 49% by weight.

13. An oriented film according to claim 11 wherein said polyamide comprises a nylon 6/nylon 12 copolymer.

14. An oriented film according to claim 11 wherein said two outer layers each comprise a blend of polymeric materials taken from the group consisting of (i) a blend of a linear low density polyethylene, a linear medium density polyethylene, and an ethylene vinyl acetate copolymer, and (ii) a blend of an ethylene propylene copolymer and a polypropylene.

15. An oriented film according to claim 11, wherein the adhesive polymeric material comprises a linear low density polyethylene-based, acid or acid anhydride-modified polymeric material when the outer layer is blend (i) of claim 4, and a polypropylene-based, acid or acid anhydride-modified polymeric material when the outer layer is blend (ii) of claim 4.

16. An oriented coextruded film having at least seven layers arranged symmetrically comprising:
   (a) a core layer comprising an ethylene vinyl alcohol copolymer;
   (b) two intermediate layers each comprising a polyamide;
   (c) two outer layers each comprising a blend of polymeric material taken from the group consisting of (i) a blend of a linear low density polyethylene, a linear medium density polyethylene, and an ethylene vinyl acetate copolymer, and (ii) a blend of an ethylene propylene copolymer and a polypropylene; and
   (d) two layers, each comprising an adhesive polymeric material, which adhere each of said intermediate layers to a respective outer layer.

17. An oriented multilayer film according to claim 16 wherein aid core layer comprises an ethylene vinyl alcohol copolymer with an ethylene content of from about 28% to about 49% by weight.

18. An oriented multilayer film according to claim 16 wherein said polyamide comprises a nylon 6/nylon 12 copolymer.

19. An oriented film according to claim 16 wherein the adhesive polymeric material comprises a linear low density polyethylene-based, acid or acid anhydride-modified polymeric material when the outer layer is blend (i), and a polypropylene-based, acid or acid anhydride-modified polymeric material when the outer layer is blend (ii).

20. An oriented film according to claim 16 wherein each of said outer layers comprises a blend of (1) from about 40%, by weight, to about 60%, by weight, of a linear low density polyethylene, (2) from about 20%, by weight, to about 30%, by weight, of a linear medium density polyethylene, and (3) from about 20%, by weight, to about 30%, by weight, of an ethylene vinyl acetate copolymer.

21. An oriented film according to claim 20 wherein said blend comprises (1) about 50%, by weight, of a linear low density polyethylene, (2) about 25%, by weight, of a linear medium density polyethylene, and (3) about 25%, by weight, of an ethylene vinyl acetate copolymer.

22. An oriented film according to claim 16 wherein each of said outer layers comprises a blend of (1) from about 85% to about 96%, by weight, of an ethylene propylene copolymer, and (2) from about 4% to about 15%, by weight, of a polypropylene.

23. An oriented film according to claim 22 wherein said blend comprises (1) about 90%, by weight, of an ethylene propylene copolymer, and (2) about 10%, by weight, of a polypropylene.

* * * * *